(12) United States Patent
Patnaikuni et al.

(10) Patent No.: US 10,547,493 B2
(45) Date of Patent: Jan. 28, 2020

(54) SYSTEM, METHOD, APPARATUS, AND COMPUTER PROGRAM PRODUCT FOR DETERMINING BEHAVIOR-BASED RELATIONSHIPS BETWEEN WEBSITE USERS

(75) Inventors: Manjeera Patnaikuni, Palo Alto, CA (US); Jingshen Jimmy Zhang, Menlo Park, CA (US); Wedge Martin, Mountain View, CA (US); David Hutchings, Livermore, CA (US); Brennan Cheung, San Jose, CA (US); Kris Duggan, Palo Alto, CA (US)

(73) Assignee: Callidus Software, Inc., Dublin, CA (US)

( * ) Notice: Subject to any disclaimer, the term of this patent is extended or adjusted under 35 U.S.C. 154(b) by 272 days.

(21) Appl. No.: 13/490,011

(22) Filed: Jun. 6, 2012

(65) Prior Publication Data
US 2013/0332593 A1 Dec. 12, 2013

(51) Int. Cl.
*H04L 29/06* (2006.01)
*G06Q 50/00* (2012.01)
*G06Q 30/02* (2012.01)

(52) U.S. Cl.
CPC ....... *H04L 29/06884* (2013.01); *G06Q 30/02* (2013.01); *G06Q 50/01* (2013.01)

(58) Field of Classification Search
CPC . G06F 9/00; G06F 9/4843; G06F 9/46; G06F 17/30867; G06F 7/00; G06F 9/48; G06F 16/958; H04L 67/303; H04L 67/28; H04L 67/2838; H04L 29/06884; H04L 29/06; G06Q 50/01; G06Q 30/02; G06Q 30/0201; G06Q 30/0254; G06Q 30/0255; G06Q 50/00

USPC ............ 709/100–240; 718/107; 707/1; 340/16.1; 370/252, 254; 714/39, 714/47.1–47.3
See application file for complete search history.

(56) References Cited

U.S. PATENT DOCUMENTS

| 7,644,134 | B2 | 1/2010 | Cohen et al. | |
|---|---|---|---|---|
| 2003/0172075 | A1* | 9/2003 | Reisman | G06F 16/951 |
| 2009/0164400 | A1* | 6/2009 | Amer-Yahia | G06Q 10/00 706/45 |

(Continued)

OTHER PUBLICATIONS

International Search Report and Written Opinion dated Dec. 6, 2013 for PCT Patent Application No. PCT/US2013/044536, 8 pages.

(Continued)

*Primary Examiner* — Wing F Chan
*Assistant Examiner* — Mehulkumar J Shah

(57) ABSTRACT

A method for determining behavior-based relationships between website users is provided. The method may include monitoring activity of a plurality of users of a website to collect data regarding interaction with one or more content items associated with the website by the plurality of users. The method may further include analyzing the collected data to determine one or more relationships among the plurality of users based at least in part on the interaction with the one or more content items by the plurality of users. The method may additionally include generating a behavior graph having a structure defined based at least in part on the determined relationships. A corresponding system, apparatus, and computer program product are also provided.

24 Claims, 9 Drawing Sheets

(56) References Cited

U.S. PATENT DOCUMENTS

| | | | |
|---|---|---|---|
| 2010/0169342 A1* | 7/2010 | Kenedy | G06F 16/9535 707/758 |
| 2010/0332570 A1 | 12/2010 | Roberts et al. | |
| 2012/0117167 A1 | 5/2012 | Sadja et al. | |
| 2012/0214486 A1 | 5/2012 | Robinson et al. | |
| 2012/0142429 A1* | 6/2012 | Muller | A63F 13/45 463/42 |
| 2012/0166380 A1* | 6/2012 | Sridharan et al. | 706/52 |
| 2013/0024439 A1* | 1/2013 | Reinholdtsen | G06F 16/951 707/706 |
| 2013/0073568 A1* | 3/2013 | Federov et al. | 707/749 |
| 2013/0073632 A1* | 3/2013 | Fedorov | G06Q 10/101 709/205 |
| 2013/0132938 A1* | 5/2013 | Agarwal | H04W 4/21 717/173 |
| 2013/0143669 A1* | 6/2013 | Muller | A63F 13/45 463/42 |
| 2013/0226865 A1* | 8/2013 | Munemann | 707/609 |

OTHER PUBLICATIONS

Facebook (Unknown, first recorded on Wayback Machine on Nov. 16, 2013). "The Graph API. The primary way to read and write to the Facebook social graph," located at https://developers.facebook.com/docs/graph-api, last visited on Wayback Machine on Aug. 21, 2014, 1 page.

The Open Graph protocol (2010, last updated on Nov. 18, 2012), located at http://ogp.me/, last visited on Aug. 19, 2014, 6 pages.

Scribd (May 5, 2010). "The Open Graph Protocol Design Decisions," located at http://www.scribd.com/doc/30715288/The-Open-Graph-Protocol-Design-Decisions, last visited on Wayback Machine on Aug. 21, 2014, 9 pages.

Facebook (May 27, 2010). "Open Graph Protocol," located at https://developers.facebook.com/docs/opengraph/, last visited on Wayback Machine on Aug. 21, 2014, 5 pages.

Farber, D. (May 24, 2007). "Facebook's Zuckerberg uncorks the social graph," located at http://www.zdnet.com/blog/btl/facebooks-zuckerberg-uncorks-the-social-graph/5156, last visited on Aug. 19, 2014, 4 pages.

Recordon, D./Facebook (Apr. 29, 2010). "The Open Graph Protocol. Understanding the Design Decision," Facebook, Powerpoint Presentation at the W3C's Linked Data Camp at WWW 2010, 20 pages.

Haugen, A./Facebook (2010). "The Open Graph Protocol Design Decisions," Abstract from the ISWC 2010, Shanghai, China, Nov. 7-11, 2010, 1 page.

* cited by examiner

SYSTEM, METHOD, APPARATUS, AND COMPUTER PROGRAM PRODUCT FOR DETERMINING BEHAVIOR-BASED RELATIONSHIPS BETWEEN WEBSITE USERS

TECHNOLOGICAL FIELD

Embodiments of the present invention relate generally to computer technology and, more particularly, relate to a system, method, apparatus, and computer program product for determining behavior-based relationships between website users.

BACKGROUND

The development of communication technology enabling users to access networks like the Internet, has led to an explosion in the number of individuals that own devices capable of accessing network information sources and services. As these individuals navigate through online networks in search of information, media content, services and the like, they create opportunities for many marketers to reach out to them to promote their goods and services. Much like a highly visible location along a major freeway, a site that boasts a large amount of traffic can be fertile ground for advertisers to reach potential customers. More traffic may also mean a higher likelihood that the content and/or services provided by the site may be requested or purchased by those visiting the site. Thus, there has been a tremendous amount of competition for user traffic.

Website designers typically want people to have a good user experience that will be remembered, cause return visits, and perhaps also be described to others to increase traffic even further. Thus, website designers essentially would like to influence user behavior to reliably influence users to desire certain content or services that the website may provide. Furthermore, the creation of user loyalty can cause return visits and also lead to expansion of traffic by word of mouth. Accordingly, website designers continue to search for ways to provide website users with a more engaging experience in order to cause users to spend an increased amount of time per visit on a website and to increase a frequency of user visits.

BRIEF SUMMARY

Systems, methods, apparatuses and computer program products are provided herein for determining behavior-based relationships between website users. Embodiments disclosed herein provide benefits for website operators as well as website users. In this regard, some example embodiments provide for the generation of a behavior graph defining relationships among a plurality of users of a website, defined based at least in part on interaction with the one or more content items associated with the website by the plurality of users. In some example embodiments, the behavior graph may be used to provide recommended content to a first user based at least in part on interaction with the content by a second user defined by the behavior graph to have a relationship with the first user. The behavior graph of some example embodiments may be used to provide recommendations that a first user follow a second user defined by the behavior graph to have a relationship with the first user (e.g., to be interested in similar content to the first user). Additionally or alternatively, in some example embodiments, notifications may be provided to a first user indicative of interactions with content items performed by one or more second users defined by the behavior graph to have a relationship with the first user.

Accordingly, some example embodiments benefit website users by leveraging a behavior graph to surface content items and/or users that may be of interest to a website user and providing recommendations to the user. Additionally, some example embodiments benefit website operators by increasing the value and appeal of a website to users, thereby potentially increasing website traffic and the amount of time that a user spends engaged with the website. As such, example embodiments may be used to engage user interest and enthusiasm to build brand loyalty to a website employing such example embodiments.

In one example embodiment, a method is provided. The method may include monitoring activity of a plurality of users of a website to collect data regarding interaction with one or more content items associated with the website by the plurality of users. The method may further include analyzing the collected data to determine one or more relationships among the plurality of users based at least in part on the interaction with the one or more content items by the plurality of users. A relationship may be determined to exist between a set of users based at least in part on a determination that the set of users have interacted with a common content item. The method may also include generating a behavior graph having a structure defined based at least in part on the determined relationships.

In another example embodiment, an apparatus comprising processing circuitry is provided. The processing circuitry may be configured to cause the apparatus to at least monitor activity of a plurality of users of a website to collect data regarding interaction with one or more content items associated with the website by the plurality of users. The processing circuitry may be further configured to cause the apparatus to analyze the collected data to determine one or more relationships among the plurality of users based at least in part on the interaction with the one or more content items by the plurality of users. A relationship may be determined to exist between a set of users based at least in part on a determination that the set of users have interacted with a common content item. The processing circuitry may also be configured to cause the apparatus to generate a behavior graph having a structure defined based at least in part on the determined relationships.

In a further example embodiment, a computer program product comprising at least one non-transitory computer-readable storage medium having computer-readable program code instructions stored therein is provided. The computer-readable program code instructions of this example embodiment may include program code instructions configured to monitor activity of a plurality of users of a website to collect data regarding interaction with one or more content items associated with the website by the plurality of users. The computer-readable program code instructions of this example embodiment may further include program instructions configured to analyze the collected data to determine one or more relationships among the plurality of users based at least in part on the interaction with the one or more content items by the plurality of users. A relationship may be determined to exist between a set of users based at least in part on a determination that the set of users have interacted with a common content item. The computer-readable program code instructions of this example embodiment may also include program instructions configured to generate a behavior graph having a structure defined based at least in part on the determined relationships.

In yet another example embodiment, an apparatus is provided. The apparatus of this example embodiment may include means for monitoring activity of a plurality of users of a website to collect data regarding interaction with one or more content items associated with the website by the plurality of users. The apparatus of this example embodiment may further include means for analyzing the collected data to determine one or more relationships among the plurality of users based at least in part on the interaction with the one or more content items by the plurality of users. A relationship may be determined to exist between a set of users based at least in part on a determination that the set of users have interacted with a common content item. The apparatus of this example embodiment may also include means for generating a behavior graph having a structure defined based at least in part on the determined relationships.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Figure 1:
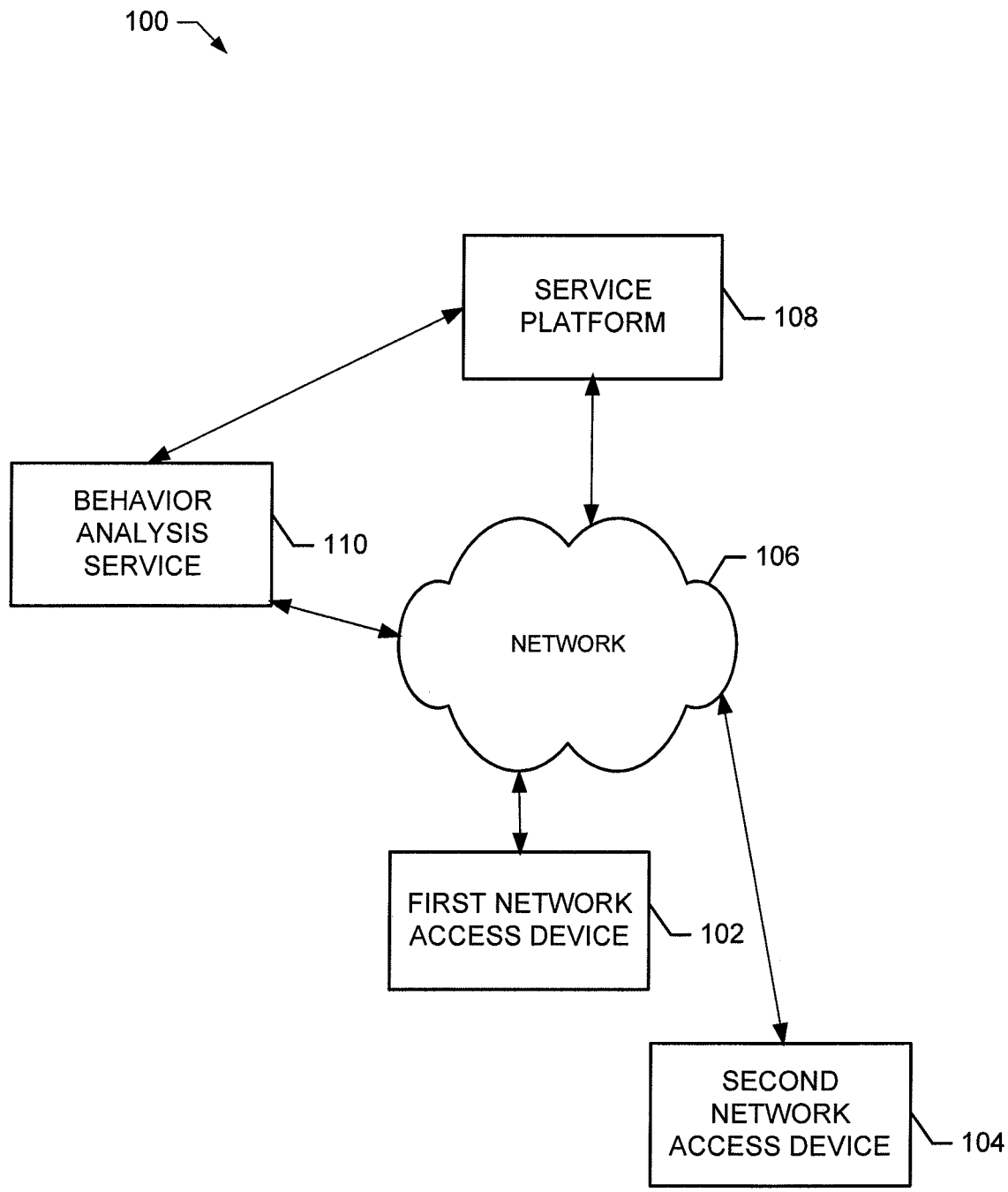
Figure 2:
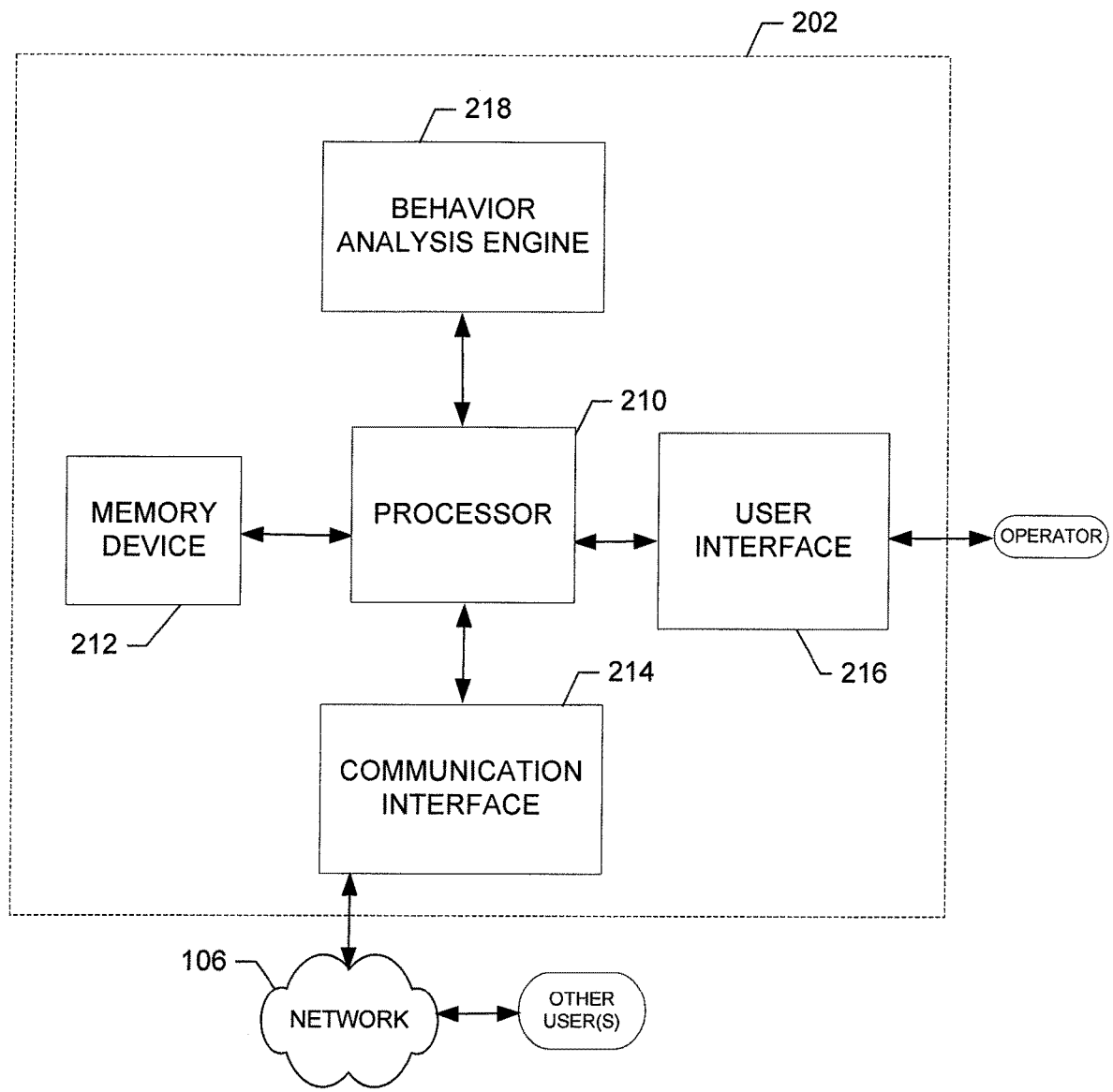
Figure 3:
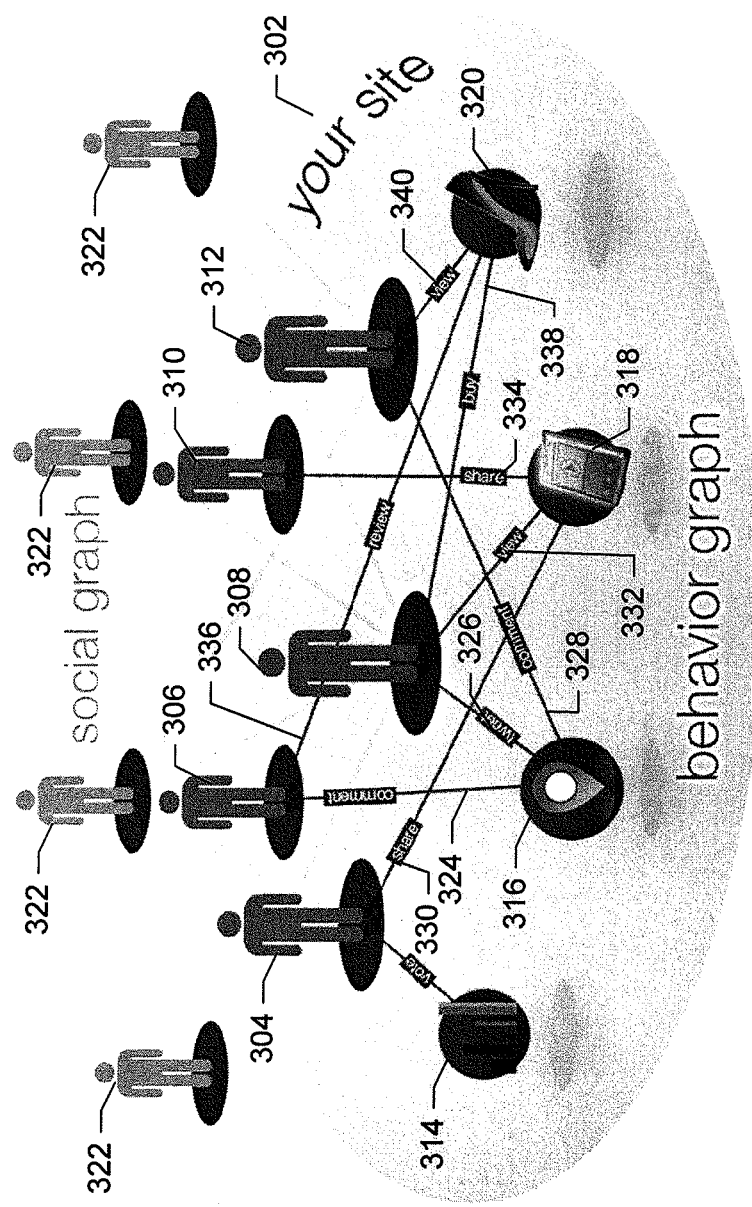
Figure 4:
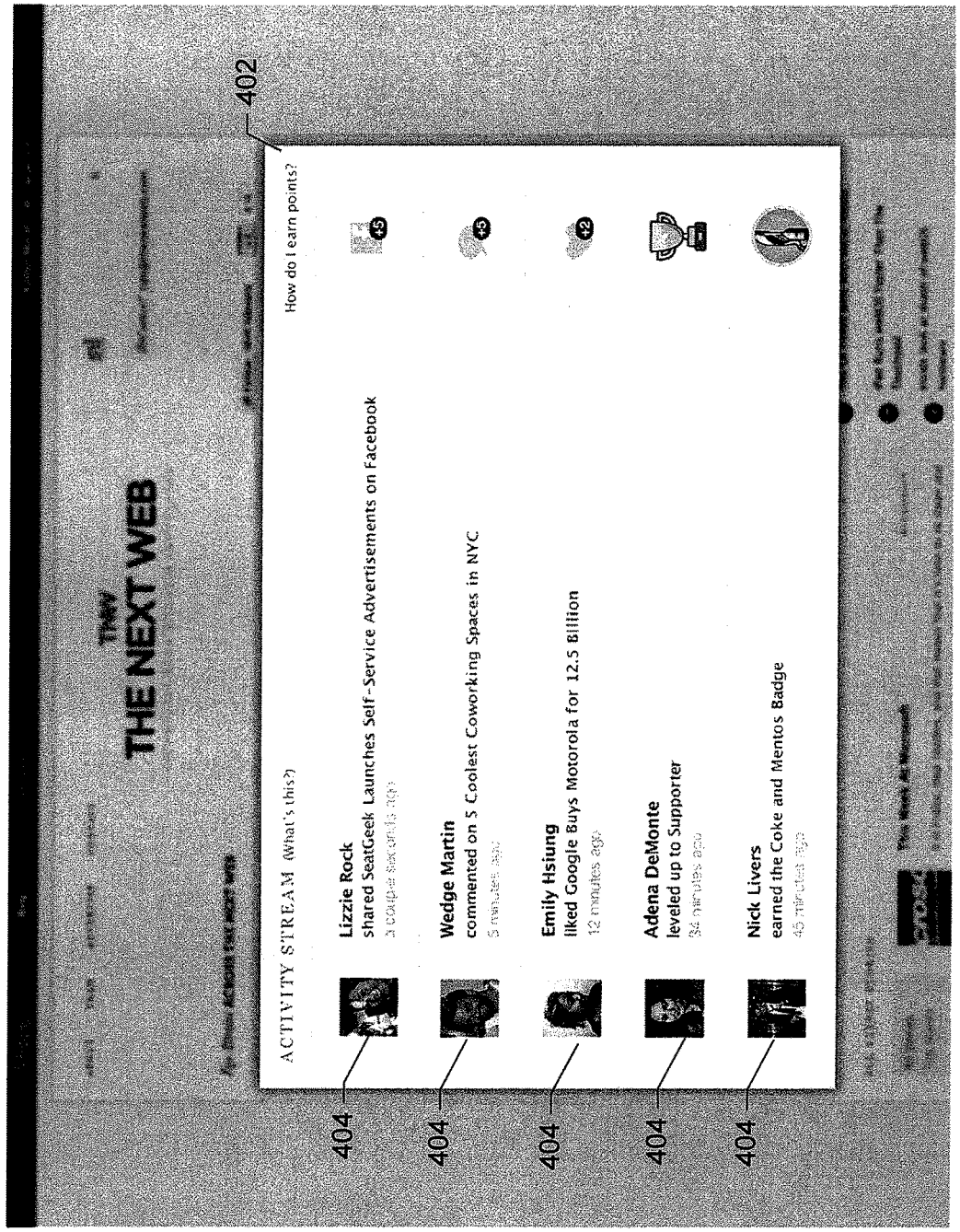
Figure 5:
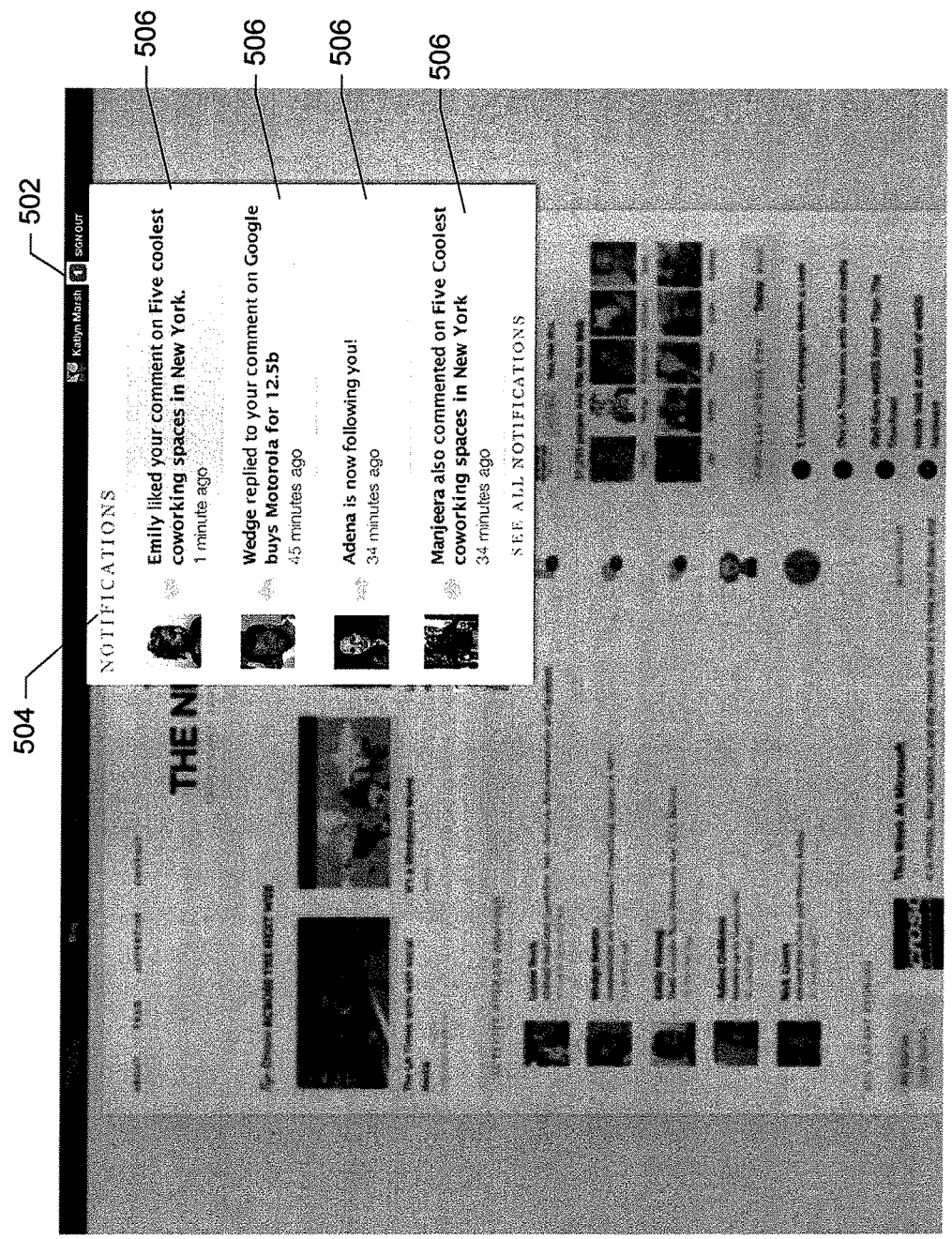
Figure 6:
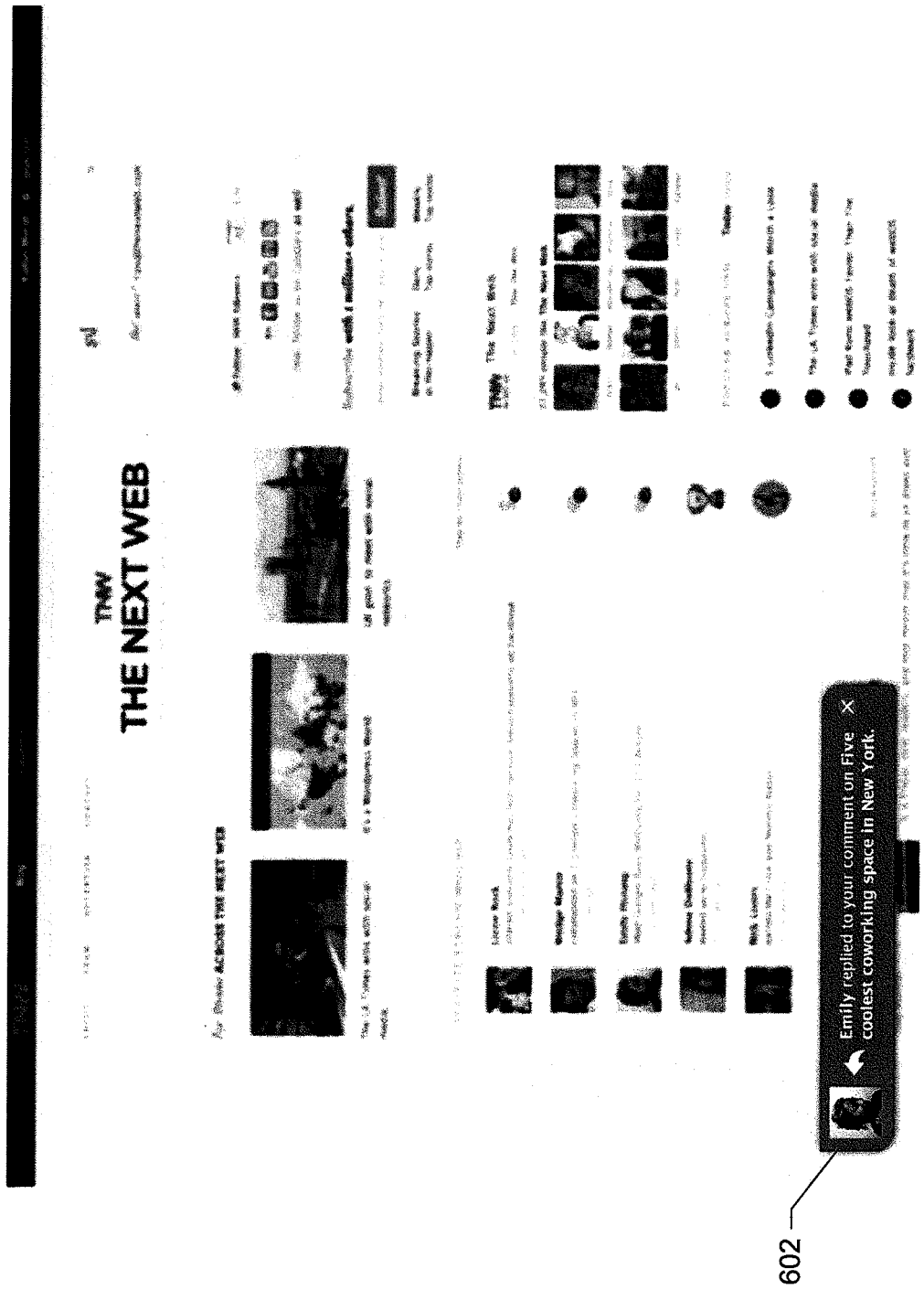
Figure 7A:
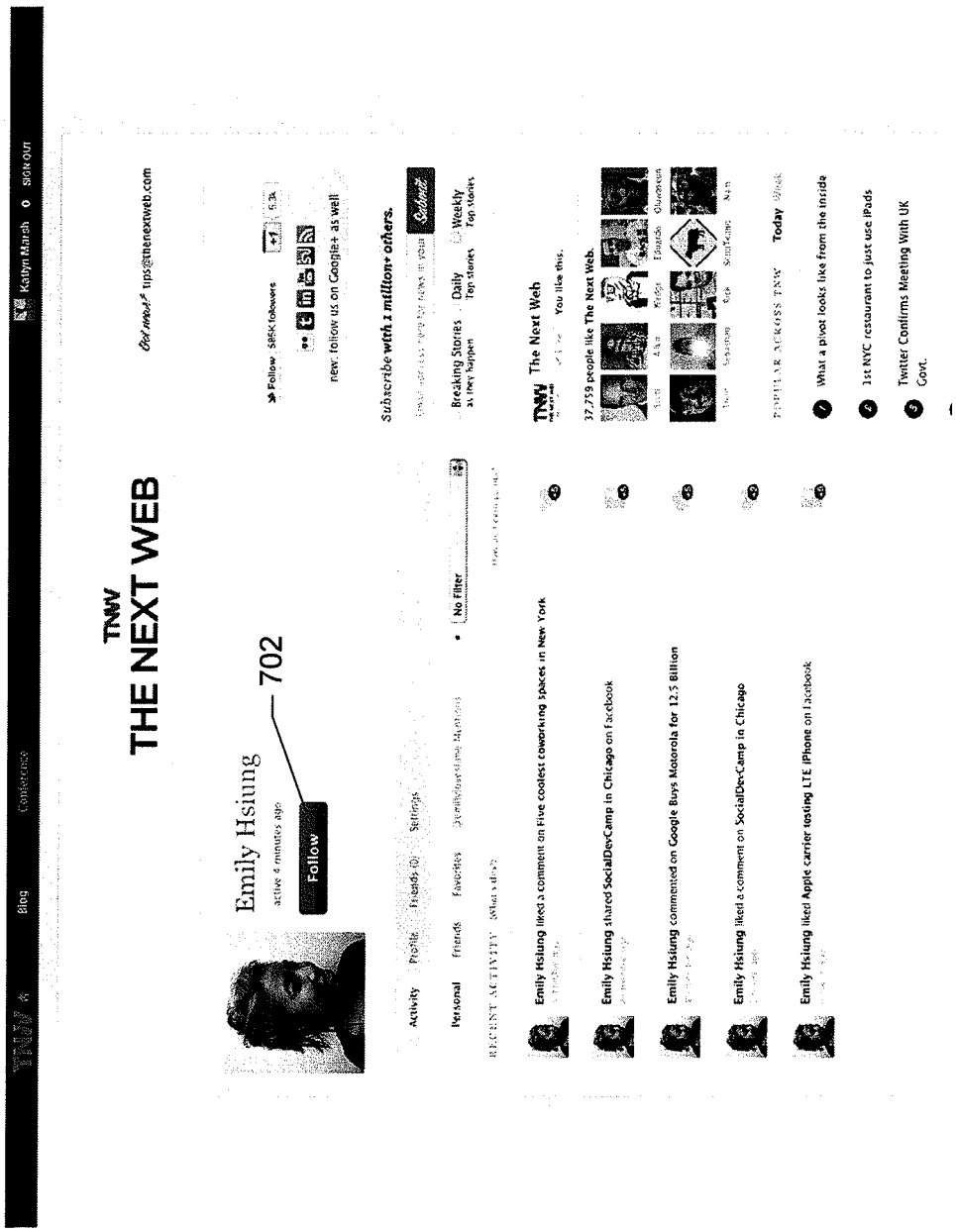
Figure 7B:
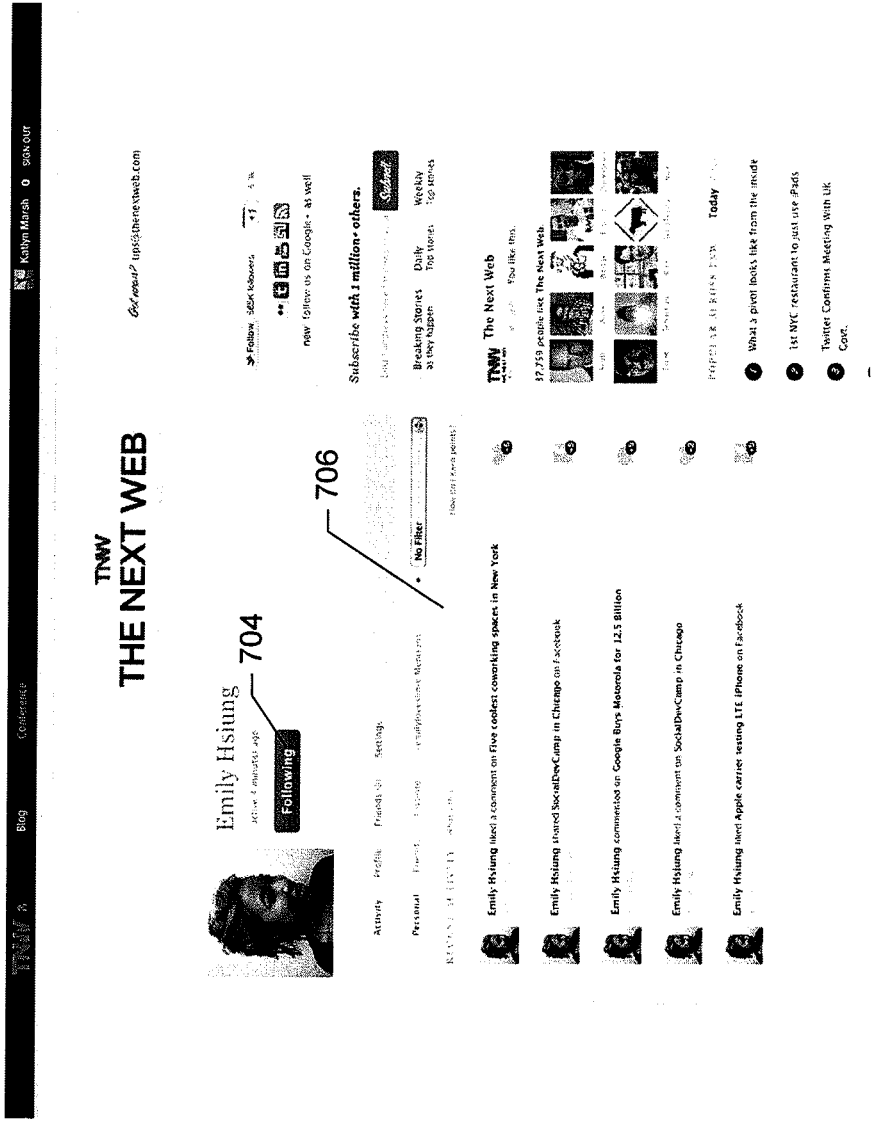
Figure 8:
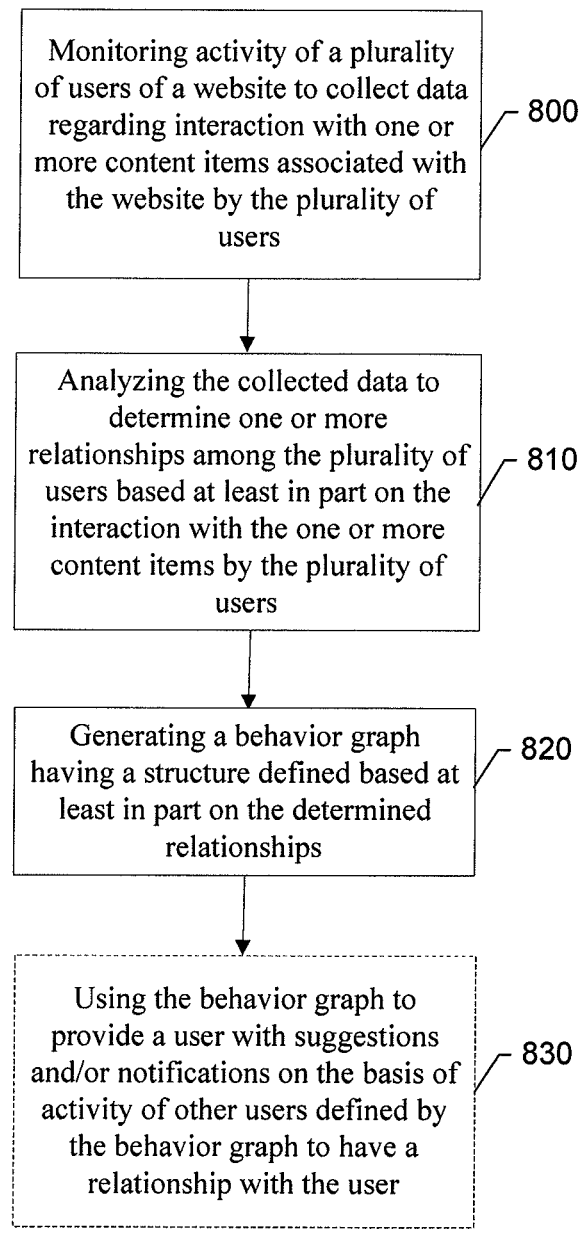

Having thus described some embodiments of the invention in general terms, reference will now be made to the accompanying drawings, which are not necessarily drawn to scale, and wherein:

FIG. 1 is a schematic block diagram of a system for determining behavior-based relationships between website users according to some example embodiments;

FIG. 2 illustrates a block diagram of an apparatus for determining behavior-based relationships between website users according to some example embodiments;

FIG. 3 illustrates an illustration of an example behavior graph structure according to some example embodiments;

FIG. 4 illustrates an example activity stream according to some example embodiments;

FIG. 5 illustrates an example of notifications provided in accordance with some example embodiments;

FIG. 6 illustrates an example notification provided in accordance with some example embodiments;

FIGS. 7A-7B illustrate an example of following another website user according to some example embodiments; and FIG. 8 illustrates a flowchart according to an example method for determining behavior-based relationships between website users according to some example embodiments.

DETAILED DESCRIPTION

Some embodiments of the present invention will now be described more fully hereinafter with reference to the accompanying drawings illustrating some embodiments of the invention. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

As used herein, the term 'circuitry' refers to hardware-only circuit implementations (e.g., implementations in analog circuitry and/or digital circuitry), combinations of circuits and software and/or firmware instructions stored on one or more non-transitory computer readable memories that work together to cause an apparatus to perform one or more functions described herein, and circuits, such as, for example, a microprocessor or a portion of a microprocessor, that requires software or firmware for operation even if the software or firmware is not physically present. As defined herein a "computer-readable storage medium," which refers to a non-transitory, physical storage medium (e.g., volatile or non-volatile memory device), can be differentiated from a "computer-readable transmission medium," which refers to an electromagnetic signal.

FIG. 1 illustrates a system 100 for determining behavior-based relationships between website users according to some example embodiments. It will be appreciated that the system 100 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for determining behavior-based relationships between website users, numerous other configurations may also be used to implement embodiments of the present invention.

The system 100 illustrates a generic system diagram illustrating some alternative system architectures that may support some example embodiments. In this regard, as shown in FIG. 1, a system in accordance with some example embodiments may include one or more network access devices (e.g., a first network access device 102 and a second network access device 104) that may each be capable of accessing network content via a network 106 according to an example embodiment.

The second network access device 104 is provided as an example to illustrate potential multiplicity with respect to instances of other devices that may be capable of communication with the network 106 and that may practice an example embodiment. The network access devices of the system may be able to communicate with network devices or with each other via the network 106 in some situations. In some cases, the network devices with which the network access devices of the system communicate may include a service platform 108 from which information can be pulled, or from which information may be pushed. In some example embodiments, the network access devices may be enabled to communicate with the service platform 108 to provide, request and/or receive information.

As indicated above, the first and second network access devices 102 and 104 that are illustrated may be examples of user terminals that are configured to enable user interface with the respective devices and also provide access to network content and/or services. In some embodiments, the first and second network access devices 102 and 104 may be computing devices such as personal computers (PCs), laptop computers, personal digital assistants (PDAs), smart phones, hand held computers, or other such devices. Each network access device may include some form of user interface (e.g., a display, speakers, and/or other output devices in combination with a mouse, touch screen, joystick, microphone, voice recognition system, wireless pointer, menu selection device such as a remote control or other input device) to enable user selections to be provided to the device as an input and various types of content to be provided as an output. It should also be noted that the first and second network access devices 102 and 104 may be either mobile or fixed devices in some examples. However, is should also be noted that not all systems that employ embodiments of the present invention may comprise all the devices illustrated and/or described herein.

In some example embodiments, the network 106 includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 106. Although not necessary, in some embodiments, the network 106 may be capable of supporting communication in accordance with any one or more of a number of wireless or wired communication protocols. Thus, in some examples, one or more of the first and second network access devices 102 and 104 may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the first and second network access devices 102 and 104 via the network 106. By directly or indirectly connecting the first and second network access devices 102 and 104 and other devices to the network 106, the first and second network access devices 102 and 104 may be enabled to communicate with the other devices (or each other), for example, according to numerous communication protocols including Hypertext Transfer Protocol (HTTP) and/or the like, to thereby carry out various communication or other functions of the first and second network access devices 102 and 104, respectively.

Furthermore, although not shown in FIG. 1, the first and second network access devices 102 and 104 may communicate in accordance with, for example, radio frequency (RF), Bluetooth (BT), Infrared (IR) or any of a number of different wireline or wireless communication techniques, including USB, LAN, wireless LAN (WLAN), Worldwide Interoperability for Microwave Access (WiMAX), WiFi, ultra-wide band (UWB), Wibree techniques and/or the like. As such, the first and second network access devices 102 and 104 may be enabled to communicate with the network 106 by any of numerous different access mechanisms. For example, mobile access mechanisms such as wideband code division multiple access (W-CDMA), CDMA2000, global system for mobile communications (GSM), general packet radio service (GPRS), long term evolution (LTE) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 108 may comprise one or more servers, a server cluster, one or more network nodes, a cloud computing infrastructure, a processing device, some combination thereof, or the like. The service platform 108 may have any number of functions or associations with various services. As such, for example, the service platform 108 may be a platform such as a dedicated server (or server bank) associated with a particular information source or service (e.g., a website or service). As another example, the service platform 108 may be a backend server associated with one or more other functions or services. As such, the service platform 108 represents a potential host for a plurality of different services or information sources. Moreover, in some cases, the service platform 108 may represent multiple entities and thus, communications and/or exchanges internal to the service platform 108 may actually include communications and/or exchanges between separate entities and/or organizations. In some embodiments, the functionality of the service platform 108 is provided by hardware and/or software components configured to operate in accordance with known techniques for the provision of information and/or services to users of communication devices such as the first and second network access devices 102 and 104. However, at least some of the functionality provided by the service platform 108 may be information provided in accordance with an example embodiment of the present invention.

In various example embodiments, the service platform 108 may be configured to provide a website or web services to users capable of accessing the network 106. Thus, for example, in embodiments in which the network 106 comprises the internet, the website or service may comprise an internet-accessible website or service. As another example, in embodiments in which the network 106 comprises a local intranet, private network, or the like, the website or service may comprise an intranet or other private website or service accessible to users capable of accessing the network. The website or service with which the service platform 108 is associated may be virtually any type of activity. Thus, for example, the service platform 108 may be configured to provide content or services associated with an online retailer, a social network, a content provider (e.g., music, news, information, videos, data, etc.), search engine, and/or the like. According to example embodiments, the website or service associated with the service platform 108 may wish to influence user behavior with respect to their website or service and may therefore utilize an example embodiment of the present invention. In one embodiment, the service platform 108 may include a Ruby on Rails application. However, this is merely one example implementation.

In some example embodiments, a behavior analysis service 110 including a behavior analysis engine 218 may also be included in the system. As such, the behavior analysis service 110 may be enabled to communicate with the service platform 108 to exchange information or content with the service platform 108 via the network 106. Thus, in some example embodiments, the behavior analysis service 110 may be configured to provide services to the service platform in relation to a customizable reward service. As such, in some embodiments, the behavior analysis service 110 may employ a local version of the behavior analysis engine 218 to actually monitor activity associated with the website or service of the service platform 108 and perform behavior analysis and relationship determination services according to the processes described herein. However, in other example embodiments, the behavior analysis service 110 may be configured to provide an instance of the behavior analysis engine 218 (or data useable to instantiate an instance of the behavior analysis engine 218) to the service platform 108 for employment at the service platform 108. Furthermore, in at least one example embodiment, the behavior analysis service 110 may be configured to operate offline or independent of the network 106. In such an example, the behavior analysis service 110 may provide an instance of the behavior analysis engine 218 (or data useable to instantiate an instance of the behavior analysis engine 218) to the service platform 108 via a transferable storage medium such as a compact disc (CD), digital video disc (DVD), flash memory, or other removable memory device that may be transferred between devices and enable content stored thereon to be extracted by or otherwise provided to a recipient device (e.g., the service platform 108).

The behavior analysis engine 218 may include or otherwise utilize hardware and/or software developed to enable social game techniques to be employed to drive user behavior as described herein and shown in FIG. 2. FIG. 2 illustrates a schematic block diagram of an apparatus for providing a customizable reward system according to an example embodiment of the present invention. Some example embodiments will now be described with reference to FIG. 2, in which certain elements of an apparatus 202 for providing a customizable reward system are displayed. The apparatus 202 of FIG. 2 may be employed, for example, on the behavior analysis service 110. However, the apparatus 202 may also be employed on the service platform 108 or any other device employing an example embodiment. Moreover, it should be noted that the devices or elements described below may not be mandatory and thus some may be omitted in certain embodiments.

Referring now to FIG. 2, the apparatus 202 may include or otherwise be in communication with a processor 210, a user interface 216, a communication interface 214 and a memory device 212. In some embodiments, the processor 210 (and/or co-processors or any other processing circuitry assisting or otherwise associated with the processor 210) may be in communication with the memory device 212 via a bus(es) for passing information among components of the apparatus 202. The memory device 212 may include, for example, one or more volatile and/or non-volatile memories. In other words, for example, the memory device 212 may be an electronic storage device (e.g., a non-transitory computer readable storage medium) to store data that may be retrievable by a machine (e.g., a computing device like the processor 210). The memory device 212 may be configured to store information, data, applications, instructions or the like for enabling the apparatus 202 to carry out various functions in accordance with an example embodiment of the present invention. For example, the memory device 212 could be configured to buffer input data for processing by the processor 210. Additionally or alternatively, the memory device 212 could be configured to store instructions for execution by the processor 210.

As indicated above, the apparatus 202 may, in some embodiments, be the behavior analysis service 110, the service platform 108 or some other communication device or computing device configured to employ an example embodiment of the present invention. However, in some embodiments, the apparatus 202 may be embodied as a chip or chip set. The processor 210 may be embodied in a number of different ways. For example, the processor 210 may be embodied as one or more of various processing means such as a coprocessor, a microprocessor, a controller, a digital signal processor (DSP), or various other processing circuitry including integrated circuits such as, for example, an ASIC (application specific integrated circuit), an FPGA (field programmable gate array), a hardware accelerator, or the like. As such, in some embodiments, the processor 210 may include one or more processing cores configured to perform independently.

In some example embodiments, the processor 210 may be configured to execute instructions stored in the memory device 212 or otherwise accessible to the processor 210. Alternatively or additionally, the processor 210 may be configured to execute hard coded functionality. As such, whether configured by hardware or software methods, or by a combination thereof, the processor 210 may represent an entity (e.g., physically embodied in circuitry) capable of performing operations according to an embodiment of the present invention while configured accordingly. Thus, for example, when the processor 210 is embodied as an ASIC, FPGA or the like, the processor 210 may be specifically configured hardware for conducting the operations described herein. Alternatively, as another example, when the processor 210 is embodied as an executor of software instructions, the instructions may specifically configure the processor 210 to perform the algorithms and/or operations described herein when the instructions are executed. However, in some cases, the processor 210 may be a processor of a specific device (e.g., the behavior analysis service 110 or the service platform 108) adapted for employing an embodiment of the present invention by further configuration of the processor 210 by instructions for performing the algorithms and/or operations described herein.

The communication interface 214 may be any means such as a device or circuitry embodied in either hardware, or a combination of hardware and software, that is configured to receive and/or transmit data from/to a network and/or any other device or module in communication with the apparatus 202. In this regard, the communication interface 214 may include, for example, an antenna (or multiple antennas) and supporting hardware and/or software for enabling communications with a wireless communication network. In some environments, the communication interface 214 may alternatively or also support wired communication. As such, for example, the communication interface 214 may include a communication modem and/or other hardware/software for supporting communication via cable, digital subscriber line (DSL), universal serial bus (USB) or other mechanisms.

The user interface 216 may be in communication with the processor 210 to receive an indication of a user input at the user interface 216 and/or to provide an audible, visual, mechanical or other output to the user. As such, the user interface 216 may include, for example, a keyboard, a mouse, a joystick, a display, a touch screen, soft keys, a microphone, a speaker, or other input/output mechanisms. The processor 210 and/or user interface circuitry comprising the processor 210 may be configured to control one or more functions of one or more elements of the user interface 216 through computer program instructions (e.g., software and/or firmware) stored on a memory accessible to the processor 210 (e.g., memory device 212, and/or the like). The user interface 216 may be remote in some instances, temporarily connectable, or even eliminated entirely (e.g., after initial programming of the behavior analysis engine 218) in some example embodiments. An operator may be enabled, via the user interface 216, to provide instructions with respect to the definition of interactions and/or other activities to be monitored on a website that may be hosted by the service platform 108, an interaction correlation lexicon defining a threshold level(s) of correlation between user interaction history for determining that users have a relationship with each other, and/or other information or configuration settings that may facilitate implementation of various example embodiments.

In some example embodiments, the processor 210 may be said to cause, direct or control the execution or occurrence of the various functions attributed to the behavior analysis engine 218 as described herein. The behavior analysis engine 218 may be any means such as a device or circuitry operating in accordance with software or otherwise embodied in hardware or a combination of hardware and software (e.g., processor 210 operating under software control, the processor 210 embodied as an ASIC or FPGA specifically configured to perform the operations described herein, or a combination thereof) thereby configuring the device or circuitry to perform the corresponding functions of the behavior analysis engine 218, as described herein. Thus, in examples in which software is employed, a device or circuitry (e.g., the processor 210 in one example) executing the software forms the structure associated with such means.

In some example embodiments, the behavior analysis engine 218 may be configured to monitor activity of users of a website that may be hosted by the service platform 108 to collect data regarding interaction with one or more content items associated with the website. In this regard, for example, the behavior analysis engine 218 may be configured to monitor interactions with one or more content items that may be associated with the website by users of a first network access device 102, second network access device 104, and/or the like. By way of non-limiting example, content items associated with the website may include web pages, videos, audio clips, blog posts, photos, web applications, and/or the like.

The behavior analysis engine 218 may be configured to monitor activity on a per user basis. For example, a user may login to a website that may be hosted by the service platform 108. As another example, a user may login to a service, such as a social networking service, and that login may be recognized by the behavior analysis engine 218 to enable the user to be uniquely identified. Accordingly, user interactions may be monitored and tracked on a user-by-user basis such that a history of interactions with content items performed by a particular user may be maintained and used to derive behavior data and determine relationships with other users in accordance with various example embodiments.

In some example embodiments in which the behavior analysis engine 218 is implemented on the service platform 108, the behavior analysis engine 218 may be configured to directly monitor user activity, such as by monitoring data that may be exchanged between the service platform 108 and a network access device. Alternatively, in some example embodiments in which the behavior analysis engine 218 is embodied remotely from the service platform 108, an indication of user activity may be provided to the behavior analysis service 110 by the service platform 108 to facilitate the performance of user activity monitoring by the behavior analysis engine 218. The indication may also include an identity of the individual performing the activity.

The monitored activity may comprise any interaction with content items that may be monitored, such as on the basis of a data request (e.g., a request for a content item), a transmission of data to the serviced platform from a network access device, and/or the like. Thus, for example, user activity may comprise accessing a content item, reading a web page, watching a video, listening to an audio clip, viewing a photo, accessing an application, commenting on a content item, adding a product or service to a shopping cart, purchasing a product or service, reviewing a product, posting a question, posting an answer to a question, sharing a content item via a social media service, opening/closing a support ticket, uploading content to a website, and/or the like.

In some example embodiments, activity that may be monitored may be defined by an operator of the website, such as via the user interface 216. In this regard, an operator may provide interaction definitions defining a lexicon of interactions with content items that may be monitored and considered for a website. Accordingly, an operator may define interactions to be monitored on the basis of interactions that may be of interest to the operator for facilitating behavior analysis, determining user behavior trends, identifying relationships between users on the basis of certain behaviors, and/or the like.

The behavior analysis engine 218 may be further configured to analyze data collected based on the monitoring to determine one or more relationships among the users of the website based at least in part on the interaction with content items associated with the website by the users. In this regard, relationship may be determined to exist between a set (e.g., two or more) users based at least in part on a determination that the set of users have interacted with a comment content item(s). For example, if two users have both purchased the same product, read the same article, and/or the like, a relationship may be determined to exist between the users.

In some example embodiments, configurations may be defined by an operator and/or website user(s) to control a threshold for finding a relationship between a set of users. In this regard, configurations may control a type(s) of interactions, number of common interactions with a content item, number of content items with which the users interacted in common, a threshold recency with which users have interacted with a common content item(s) (e.g., within the last week, month, year, or other time period), and/or other criteria specifying a minimum threshold for determining that a relationship exists between a set of users. In this regard, user and/or operator defined configuration settings may specify an interaction correlation lexicon defining one or more threshold levels of correlation between one or more interactions performed by a first user and one or more interactions performed by a second user for a relationship to be determined to exist between the first user and the second user.

For example, an operator may specify configuration settings to define an interaction correlation lexicon to define the types of correlations that may be of interest to the website operator for analyzing trends, providing a behavior-based suggestions and services to users to promote user engagement, and/or the like. As another example, in some example embodiments, a user may specify configuration settings to define an interaction correlation lexicon so as to control the number and/or types of users that may be found to have a relationship to a user. Accordingly, a user may use such configuration settings to control the types and number of behavior-based suggestions that may be provided to the user in accordance with some example embodiments.

The behavior analysis engine 218 may be further configured to generate a behavior graph having a structure defined based at least in part on the relationships determined to exist between website users. In some example embodiments, the behavior graph may be specific to users of a single website or set of websites. In some example embodiments, the behavior graph may be maintained (e.g., on the memory device 212) in a relational database, such as by way of non-limiting example a NoSQL database.

The behavior graph may have any of a variety of structures that may serve to define relationships between users on the basis of their prior interactions with content items associated with the website. For example, the structure of the behavior graph may comprise a plurality of nodes and one or more edges connecting respective nodes. The plurality of nodes may include a plurality of user nodes and at least one content node. A user node may represent a respective website user and a content node may represent a respective content item associated with the website. For example, a content node may be associated with particular Uniform Reference Locator (URL) or other reference that may be used for a content item. An edge connecting a user node to a content node may represent an interaction with the content item associated with the content node previously performed by the user associated with the user node. Thus, for example, for a set of users for which a relationship is determined to exist, the relationship may be represented in the behavior graph by a plurality of user nodes representative of the set of users connected by respective edges to the same content node.

FIG. 3 illustrates an illustration of an example behavior graph structure according to some example embodiments. In this regard, the behavior graph of FIG. 3 illustrates relationships among users 304, 306, 308, 310, and 312 of a website realm 302. The relationships among users 304, 306, 308, 310, and 312 may be determined on the basis of the users' interactions with one or more of content items 314, 316, 318, and 320 on the website.

In some instances, the users 304, 306, 308, 310, and 312 may not "know" each other in real life, or even in the virtual world. In this regard, relationships among the users 304, 306, 208, 310, and 312 may be surfaced by the behavior graph solely based on the users' interactions with content items on the website. This contrasts the behavior graph from a social graph representing a user's connections with friends (e.g., real world and/or virtual world friends) on a social network. However, as illustrated in FIG. 3, one or more of the users 304, 306, 308, 310, and 312 may have one or more friends 322 on a social network that may be represented by such a social graph.

As illustrated in the example of FIG. 3, a relationship may exist between the set of users 306, 308, and 312, as each interacted with the content item 316. In this regard, user 306 commented (edge 324) on content item 316, user 308 shared (edge 326) content item 316 on a social network, and user 312 commented (edge 328) on content item 316. Similarly, a relationship may exist between users 304, 308, and 310. In this regard, user 304 shared (edge 330) content item 318, user 308 viewed (edge 332) content item 318, and user 310 shared (edge 334) content item 318. Additionally, a relationship may exist between users 306, 308, and 312. In this regard, user 306 reviewed (edge 336) content item 320, user 308 bought (edge 338) content item 320, and user 312 viewed (edge 340) content item 320.

Thus, the behavior graph may comprise data defining a series of user interactions that may be defined by a user, an interaction, and an object of the interaction. For example, the behavior graph indicates that user 304 shared 330 (the interaction) content item 318 (the object of the interaction).

As another example, the behavior graph indicates that user 312 viewed 340 (the interaction) content item 320 (the object of the interaction).

The behavior graph may be used in some example embodiments to surface relationships between users. These relationships may be used by a website operator to facilitate analysis of user behavior on websites, provide users with suggested content on the basis of their shared interactions with other users, and/or the like. As a further example, the behavior graph may be used in some example embodiments to foster connections between users having shared interests and engagement patterns based on the type of interactions they perform and the type of content items they interact with on a website.

For example, the behavior analysis engine 218 of some example embodiments may be configured to provide a recommendation to a first user that the first user interact with a content item in response to a second user defined by the behavior graph to have a relationship with the first user interacting with the content item. As another example, the behavior analysis engine 218 may be configured to provide a notification to a user regarding interactions with content items performed by other users defined by the behavior graph to have a relationship with the user. Thus, for example, the behavior analysis engine 218 may determine that a first user has performed an interaction with a content item and, in response to the determination, provide a notification to a second user defined by the behavior graph to have a relationship with the first user. The notifications of some example embodiments may be presented in real time as interactions to which the notifications are related are performed.

In some example embodiments, notifications, suggested content items, and/or other suggestions or information that may be surfaced on the basis of the behavior graph may be presented to the user in the form of an activity stream. The activity stream may be accessible via the website such that it may be integrated into the user's browsing experience. The activity stream may include a series of items related to interactions performed by other users defined by the behavior graph to have a relationship with the user. Referring to FIG. 4, FIG. 4 illustrates an example activity stream 402 that may be presented to a website user in accordance with some example embodiments. The activity stream 402 includes a series of news items 404 indicative of activity of other users that may be defined by a behavior graph to have a relationship with the user.

In some example embodiments, notifications, suggested content items, and/or other suggestions or information that may be surfaced on the basis of the behavior graph may be presented as one or more notifications that may be accessed via a website interface. For example, FIG. 5 illustrates an example in which recent notifications may be accessed via an icon 502 on a website graphical user interface. Selection of the icon 502 may present a dropdown interface 504 comprising one or more recent notifications 506.

As another example, a notification may be presented as a pop-up notification while a user is browsing a website. For example, FIG. 6 illustrates a pop-up notification 602 that may be presented to a user while the user is browsing a website. The pop-up notification 602 may, for example, comprise a notification of an interaction with a content item performed by another user defined by the behavior graph to have a relationship with the user to which the notification 602 is presented.

In some example embodiments, presentation of notifications and/or suggestions may be controlled based on user configuration settings. For example, a user may define settings specifying types of interactions for which the user wishes to receive notification, types of interactions for which that the user does not wish to receive notification, users for which the user wishes to receive notifications, users for which the user does not wish to receive notifications, and/or the like.

Additionally or alternatively, in some example embodiments, a user may be able to control the types of notifications that may be presented to other users regarding his or her interactions with content items through configuration of privacy settings. For example, a user may select that certain types of interactions not be broadcast to other users. As another example, a user may select users that may receive and/or that are blocked from receiving notifications regarding his or her activities. Thus, in some example embodiments, a second user may be provided with a notification only in an instance in which a privacy setting associated with a first user who performed the interaction that is the subject of the notification permits notification of the interaction to the second user.

In some example embodiments, a first user of a website may follow a second user of the website. In this regard, a user who follows a second user may receive notifications and suggestions on the basis of the second user's interactions with content items on the website. The behavior analysis engine 218 of some example embodiments may be configured to suggest to a first user that the first user follow a second user that is defined by the behavior graph to have a relationship with the first user. Thus, in some example embodiments, a first user may elect to proactively follow a second user in order to receive notifications and suggestions based on activity of the second user rather than automatically receiving notifications and suggestions based the relationship defined to exist between the first user and the second user by the behavior graph.

FIGS. 7A-7B illustrate an example of following another website user according to some example embodiments. In this regard, FIG. 7A illustrates an example of a user being presented with a suggestion to follow another user, such as on the basis of a relationship that may be surfaced from a behavior graph. The user may select to follow the suggested user by selecting the option 702 to follow the user. As illustrated in FIG. 7B, if a user is following another user, an indication 704 that the other user is being followed may be presented. Additionally, notifications and/or suggestions based on activities of the followed user may be presented, such as in the activity stream 706.

As such, it will be appreciated that the behavior graph of some example embodiments may be used to connect users to others who share similar interests and/or provide content suggestions based on other users determined to have similar interests. Since the behavior graph may be generated on the basis of activities of all users of a website, suggestions may not be limited merely to other users connected within a social network, but rather may be based on the global realm of website users. Thus, for example, while a user may be unique amongst his friends in his social network in having an interest in big cats, the user may be connected to other users and/or provided with suggestions based on other users of a website that have been determined on the basis of a behavior graph to also have an interest in big cats. Accordingly, the behavior graph of some example embodiments may be used to connect website users and/or provide tailored suggestions to website users on the basis of interactions performed by other website users that may not have a social network connection.

In some example embodiments, a behavior graph may be merged with a social graph that may define relationships between individuals within a social networking context. In this regard, in some example embodiments, the behavior analysis engine 218 may be configured to generate a combined social and behavior graph that may include connections defined based at least in part on both the relationships determined to exist between website users and on social connections between users of one or more social networks. The combined social and behavior graph may comprise both user nodes and content item nodes, such as illustrated in the example behavior graph of FIG. 3. However, in the combined social and behavior graph of some example embodiments, both edges defined based on both (1) interactions/behaviors relating to content items of a website and (2) edges defined based on personal relationships between users in one or more social networks. The combined social and behavior graph may be used to predict relationships between users with more accuracy than usage of a behavior graph or social graph on its own. In this regard, the combined social and behavior graph may provide additional input information (e.g., personal relationship information in addition to behavior-based relationships) that may be leveraged by the behavior analysis engine 218 to surface relationships between users.

Referring now to FIG. 8, FIG. 8 illustrates a flowchart according to an example method for determining behavior-based relationships between website users according to some example embodiments. In this regard, FIG. 8 illustrates operations that may be performed by the apparatus 202. The operations illustrated in and described with respect to FIG. 8 may, for example, be performed by, with the assistance of, and/or under the control of one or more of the processor 210, memory device 212, communication interface 214, user interface 216, and/or behavior analysis engine 218. Operation 800 may comprise monitoring activity of a plurality of users of a website to collect data regarding interaction with one or more content items associated with the website by the plurality of users. The processor 210, memory device 212, communication interface 214, and/or behavior analysis engine 218 may, for example, provide means for performing operation 800. Operation 810 may comprise analyzing he collected data to determine one or more relationships among the plurality of users based at least in part on the interaction with the one or more content items by the plurality of users. The processor 210, memory device 212, communication interface 214, and/or behavior analysis engine 218 may, for example, provide means for performing operation 810. Operation 820 may comprise generating a behavior graph having a structure defined based at least in part on the determined relationships. The processor 210, memory device 212, communication interface 214, and/or behavior analysis engine 218 may, for example, provide means for performing operation 820. The method may further optionally include operation 830, which may comprise using the behavior graph to provide a user with suggestions and/or notifications on the basis of activity of other users defined by the behavior graph to have a relationship with the user. The processor 210, memory device 212, communication interface 214, user interface 216, and/or behavior analysis engine 218 may, for example, provide means for performing operation 820.

FIG. 8 illustrates a flowchart of a system, method, and computer program product according to some example embodiments. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory device 212) storing instructions executable by a processor in the computing device (for example, by the processor 210). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, the apparatus 202) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a mobile data capture apparatus 102 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   monitoring activity of a plurality of users of a web site to collect data regarding one or more interactions with one or more content items associated with the website;
   analyzing, by a processor, the data to determine one or more behavior-based relationships among the plurality of users based at least in part on the one or more interactions with the one or more content items by the plurality of users, wherein a particular behavior-based relationship is determined to exist between a set of users based at least in part on an interaction correlation lexicon defining a threshold levels of correlation between user interaction history for determining that the set of users have a number of common interactions with a number of common content items within a predetermined time period defined in a recency threshold and further based on a quantity of content items that are being interacted with and that are common to the plurality of users;
   generating a behavior graph having a structure defined at least in part by the one or more behavior-based relationships, wherein each behavior-based relationship in the behavior graph is depicted as an edge of a plurality of different edges in the behavior graph that indicates a type of interaction that is common between two users within the set of users, wherein each edge from the plurality of different edges is associated with a different type of interaction; and
   determining a relationship between two or more of the plurality of users based at least in part upon the one or more behavior-based relationships in the behavior graph.

2. The method of claim 1, wherein the structure of the behavior graph comprises a plurality of nodes, and ones of the plurality of different edges connecting respective ones of the plurality of nodes, wherein the plurality of nodes comprises a plurality of user nodes and at least one content node, wherein each of the plurality of user nodes represents a respective one of the plurality of users, wherein the at least one content node represents a respective content item associated with the website, and wherein an edge connecting a particular user node of the plurality of user nodes to the at least one content node represents an interaction with the respective content item associated with the at least one content node performed by a particular user associated with the particular user node.

3. The method of claim 2, wherein the set of users for which a relationship is determined to exist is represented in the behavior graph by a corresponding set of the plurality of user nodes connected by respective edges to the at least one content node.

4. The method of claim 1, wherein analyzing the data to determine the one or more behavior-based relationships among the plurality of users comprises determining the one or more behavior-based relationships based at least in part on an operator-defined interaction correlation lexicon defining one or more threshold levels of correlation between first one or more interactions performed by a first user and second one or more interactions performed by a second user for a relationship to be determined to exist between the first user and the second user.

5. The method of claim 1, wherein analyzing the data to determine the one or more behavior-based relationships among the plurality of users comprises determining whether a relationship exists between a first user and a second user based at least in part on one or more configuration settings defined by the first user, the configuration settings providing the interaction correlation lexicon defining one or more threshold levels of correlation between first one or more interactions performed by the first user and second one or more interactions performed by a second user for a relationship to be determined to exist between the first user and another user.

6. The method of claim 1, further comprising in an instance in which a relationship is determined to exist between a first user and a second user, providing a suggestion to the first user that the first user follow the second user such that the first user will be notified of other ones of the one or more content items on the website that the second user has interacted with.

7. The method of claim 1, further comprising:
determining that a first user has interacted with a particular content item associated with the website; and
responsive to the determination, providing a notification to a second user indicated by the behavior graph to have a relationship with the first user, the notification informing the second user that the first user interacted with the particular content item.

8. The method of claim 7, wherein providing the notification to the second user comprises providing the notification to the second user only in an instance in which a privacy setting associated with the first user permits the notification.

9. The method of claim 1, further comprising providing a recommendation to a first user that the first user interact with a particular content item associated with the website in response to a second user defined by the behavior graph to have a relationship with the first user interacting with the particular content item.

10. The method of claim 1, wherein the type of interaction associated with the one or more behavior-based relationships includes one or more of:
a view interaction;
a purchase interaction;
a share interaction;
a review interaction; or
a vote interaction.

11. The method of claim 4, wherein the one or more threshold levels include:
a predetermined number of common interactions with a particular content item; and
a predetermined number of common content items with which the first user and second user have interacted.

12. The method of claim 1, further comprising: merging the behavior graph with a social graph to generate a merged graph, wherein the social graph represents social relationships between social users in a social network;
wherein a structure of the merged graph comprises a plurality of merged graph nodes and one or more merged graph edges connecting respective ones of the plurality of nodes, wherein the plurality of merged graph nodes comprises a plurality of user nodes and at least one content node, wherein each of the plurality of user nodes represents a respective one of the plurality of users, wherein the at least one content node represents a respective content item associated with the website, wherein a particular merged graph edge of the one or more merged graph edges connecting a particular user node of the plurality of user nodes to the at least one content node represents an interaction with the respective content item associated with the at least one content node performed by a particular user associated with the particular user node, and wherein another edge connecting a first user node to a second user node represents a particular social relationship in the social graph.

13. The method of claim 1, wherein the interaction correlation lexicon specifies one or more types of activities to be monitored associated with the one or more content items, and wherein information is displayed to a first user in an activity stream based at least in part on activities of the plurality of users and the interaction correlation lexicon.

14. A computing system comprising:
a processor; and
a memory communicatively coupled to the processor, the memory including a plurality of instructions that are executable by the processor to cause the computing system to:
monitor activity of a plurality of users of a website to collect data regarding one or more interactions with one or more content items associated with the web site;
analyze the data to determine one or more behavior-based relationships among the plurality of users based at least in part on the one or more interactions with the one or more content items by the plurality of users, wherein a particular behavior-based relationship is determined to exist between a set of users based at least in part on an interaction correlation lexicon defining a threshold levels of correlation between user interaction history for determining that the set of users have a number of common interactions with a number of common content items within a predetermined time period defined in a recency threshold and further based on a quantity of content items that are being interacted with and that are common to the plurality of users;
generate a behavior graph having a structure defined at least in part by the one or more behavior-based relationships, wherein each behavior-based relationship in the behavior graph is depicted as an edge of a plurality of different edges in the behavior graph that indicates a type of interaction that is common between two users within the set of users, wherein each edge from the plurality of different edges is associated with a different type of interaction;
determine a relationship between two or more of the plurality of users based upon the one or more behavior-based relationships in the behavior graph; and
suggest content items based on the behavior graph.

15. The computing system of claim 14, wherein the structure of the behavior graph comprises a plurality of nodes, and ones of the plurality of different edges connecting respective ones of the plurality of nodes, wherein the plurality of nodes comprises a plurality of user nodes and at least one content node, wherein each of the plurality of user nodes represents a respective one of the plurality of users, wherein the at least one content node represents a respective content item associated with the website, and wherein an edge connecting a particular user node of the plurality of user node to the at least one content node represents an interaction with the respective content item associated with the at least one content node performed by a particular user associated with the particular user node.

16. The computing system of claim 15, wherein the set of users for which a relationship is determined to exist is represented in the behavior graph by a corresponding set of plurality of user nodes connected by respective edges to the at least one content node.

17. The computing system of claim 14, wherein the plurality of instructions are further executable by the processor to cause the computing system to analyze the data to determine the one or more behavior-based relationships among the plurality of users based at least in part on an operator-defined interaction correlation lexicon defining one or more threshold levels of correlation between first one or more interactions performed by a first user and second one or more interactions performed by a second user for a relationship to be determined to exist between the first user and the second user.

18. The computing system of claim 14, wherein the plurality of instructions are further executable by the processor to cause the computing system to analyze the data to determine one or more behavior-based relationships among the plurality of users based at least in part by determining whether a relationship exists between a first user and a second user based at least in part on one or more configuration settings defined by the first user, the configuration settings providing the interaction correlation lexicon defining one or more threshold levels of correlation between first one or more interactions performed by the first user and second one or more interactions performed by a second user for a relationship to be determined to exist between the first user and another user.

19. The computing system of claim 14, wherein the plurality of instructions are further executable by the processor to cause the computing system to in an instance in which a relationship is determined to exist between a first user and a second user, providing a suggestion to the first user that the first user follow the second user such that the first user will be notified of interactions with content items on the website performed by the second user.

20. The computing system of claim 14, wherein the plurality of instructions are further executable by the processor to cause the computing system to:
    determine that a first user has interacted with a particular content item associated with the website; and
    responsive to the determination, provide a notification to a second user indicated by the behavior graph to have a relationship with the first user, the notification informing the second user that the first user has interacted with the particular content item.

21. The computing system of claim 20, wherein the plurality of instructions are further executable by the processor to cause the computing system to provide the notification to the second user only in an instance in which a privacy setting associated with the first user permits the notification.

22. The computing system of claim 14, wherein the plurality of instructions are further executable by the processor to cause the computing system to provide a recommendation to a first user that the first user interact with a particular content item associated with the website in response to a second user defined by the behavior graph to have a relationship with the first user interacting with the content item.

23. A computer program product comprising at least one non-transitory computer-readable storage medium having computer-readable program instructions stored therein, the computer-readable program instructions executable by a computing system to perform acts comprising:
    monitoring activity of a plurality of users of a web site to collect data regarding one or more interactions with one or more content items associated with the website;
    analyzing the data to determine one or more behavior-based relationships among the plurality of users based at least in part on the one or more interactions with the one or more content items by the plurality of users, wherein a particular behavior-based relationship is determined to exist between a set of the plurality of users based at least in part on an interaction correlation lexicon defining a threshold levels of correlation between user interaction history for determining that the set of the plurality of users have a threshold number of common interactions with a number of common content items within a predetermined time period defined in a recency threshold and further based on a threshold quantity of content items that are being interacted with and that are common to the plurality of users;
    generating a behavior graph having a structure defined at least in part by the one or more behavior-based relationships, wherein each behavior-based relationship in the behavior graph is depicted as an edge of a plurality of different edges in the behavior graph that indicates a type of interaction that is common between two users within the set of users, wherein each edge from the plurality of different edges is associated with a different type of interaction; and
    determine a relationship between two or more of the plurality of users based at least in part upon the one or more behavior-based relationships in the behavior graph.

24. The computer program product of claim 23, wherein the structure of the behavior graph comprises a plurality of nodes, and ones of the plurality of different edges connecting respective ones of the plurality of nodes, wherein the plurality of nodes comprises a plurality of user nodes and at least one content node, wherein each of the plurality of user nodes represents a respective one of the plurality of users, wherein the at least one content node represents a respective content item associated with the website, and wherein an edge connecting a particular user node of the plurality of user nodes to the at least one content node represents an interaction with the respective content item associated with the at least one content node performed by a particular user associated with the particular user node.

* * * * *